United States Patent
Callaghan et al.

(10) Patent No.: US 8,291,309 B2
(45) Date of Patent: Oct. 16, 2012

(54) SYSTEMS AND METHODS THAT UTILIZE SCALABLE VECTOR GRAPHICS TO PROVIDE WEB-BASED VISUALIZATION OF A DEVICE

(75) Inventors: David M. Callaghan, Concord, OH (US); Brian A. Batke, Novelty, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 1643 days.

(21) Appl. No.: 10/731,940

(22) Filed: Dec. 10, 2003

(65) Prior Publication Data

US 2005/0108364 A1 May 19, 2005

Related U.S. Application Data

(60) Provisional application No. 60/520,267, filed on Nov. 14, 2003.

(51) Int. Cl.
*G06F 17/00* (2006.01)
*G06F 3/00* (2006.01)

(52) U.S. Cl. ........ 715/234; 715/760; 715/764; 715/808; 715/866

(58) Field of Classification Search .................. 715/700; 700/84; 455/574; 713/320; 709/219
See application file for complete search history.

(56) References Cited

U.S. PATENT DOCUMENTS

| | | | | |
|---|---|---|---|---|
| 4,303,973 A * | 12/1981 | Williamson et al. | ............ | 700/84 |
| 4,570,217 A * | 2/1986 | Allen et al. | ...................... | 700/83 |
| 5,630,041 A * | 5/1997 | Mills et al. | ..................... | 345/441 |
| 5,631,825 A * | 5/1997 | van Weele et al. | .............. | 700/83 |
| 5,790,977 A * | 8/1998 | Ezekiel | ......................... | 702/122 |
| 5,917,730 A * | 6/1999 | Rittie et al. | ....................... | 703/6 |
| 5,982,362 A * | 11/1999 | Crater et al. | ................... | 715/719 |
| 6,353,926 B1 * | 3/2002 | Parthesarathy et al. | ....... | 717/170 |
| 6,457,883 B1 | 10/2002 | Silverbrook | | |
| 6,606,731 B1 * | 8/2003 | Baum et al. | .................... | 716/103 |
| 6,792,321 B2 * | 9/2004 | Sepe, Jr. | ........................... | 700/65 |
| 6,999,101 B1 * | 2/2006 | Sanborn et al. | ............... | 345/619 |
| 7,020,882 B1 * | 3/2006 | Lewallen | ....................... | 719/328 |
| 7,058,693 B1 * | 6/2006 | Baker, Jr. | ....................... | 709/217 |
| 7,113,085 B2 * | 9/2006 | Havekost | ...................... | 340/506 |
| 7,143,153 B1 * | 11/2006 | Black et al. | .................... | 709/223 |

(Continued)

OTHER PUBLICATIONS

Lau et al. "Emerging Web Graphics Standards and Technologies" Jan. 2003 IEEE, vol. 23, Issue 1 pp. 66-75.*

(Continued)

*Primary Examiner* — Steven B Theriault

(74) *Attorney, Agent, or Firm* — Turocy & Watson, LLP; R. Scott Speroff; John M. Miller

(57) ABSTRACT

The present invention relates to systems and methods that employ scalable vector graphics (SVG) to view and effectuate an industrial device from a remote Web interface. The systems and methods can be utilized to retrieve an SVG XML markup language-based file associated with the device and execute the SVG file via basic ASCII drawing commands. Thus, a faceplate of an industrial device and/or other device-related information can be represented via SVG syntax and stored with the device. A user can employ a Web browser from a remote location (e.g., via a Web client) to retrieve the SVG file, wherein the file can be loaded within the Web browser and/or an open source software package. The SVG file can be executed to render an interactive graphical faceplate that can depict LEDs, alphanumeric displays, inputs/output, etc., trending mechanisms (e.g., graphs, charts, etc.), and capabilities to load parameters.

28 Claims, 8 Drawing Sheets

U.S. PATENT DOCUMENTS

| | | | | |
|---|---|---|---|---|
| 7,203,560 | B1* | 4/2007 | Wylie et al. | 700/110 |
| 7,210,095 | B1* | 4/2007 | Mor | 715/234 |
| 7,237,109 | B2* | 6/2007 | Scott et al. | 713/164 |
| 7,395,126 | B2* | 7/2008 | Decker | 700/65 |
| 7,415,697 | B1* | 8/2008 | Houlding | 717/104 |
| 7,555,706 | B2* | 6/2009 | Chapman et al. | 715/234 |
| 7,787,992 | B2* | 8/2010 | Pretlove et al. | 700/259 |
| 7,961,201 | B1* | 6/2011 | Fix et al. | 345/629 |
| 2002/0051008 | A1* | 5/2002 | Mathis et al. | 345/705 |
| 2002/0055790 | A1* | 5/2002 | Havekost | 700/80 |
| 2002/0091736 | A1* | 7/2002 | Wall | 707/513 |
| 2002/0101431 | A1* | 8/2002 | Forney et al. | 345/582 |
| 2002/0124076 | A1* | 9/2002 | Lindstrom-Tamer | 709/224 |
| 2003/0016233 | A1* | 1/2003 | Charpentier | 345/619 |
| 2003/0098862 | A1* | 5/2003 | Hunt et al. | 345/418 |
| 2003/0105535 | A1* | 6/2003 | Rammler | 700/17 |
| 2004/0021679 | A1* | 2/2004 | Chapman et al. | 345/700 |
| 2004/0083453 | A1* | 4/2004 | Knight et al. | 717/113 |
| 2004/0107085 | A1* | 6/2004 | Moosburger et al. | 703/13 |
| 2004/0113937 | A1* | 6/2004 | Sawdey et al. | 345/738 |
| 2004/0148292 | A1* | 7/2004 | Clemens | 707/100 |
| 2004/0177357 | A1* | 9/2004 | Heller et al. | 718/100 |
| 2004/0194057 | A1* | 9/2004 | Schulte et al. | 717/114 |
| 2004/0243935 | A1* | 12/2004 | Abramovitch | 715/523 |
| 2006/0010246 | A1* | 1/2006 | Schulz et al. | 709/232 |
| 2006/0129683 | A1* | 6/2006 | Hansen et al. | 709/229 |
| 2008/0058968 | A1* | 3/2008 | Sharma et al. | 700/84 |

OTHER PUBLICATIONS

W3C et al. "Scalable Vector Graphics (SVG) 1.1 Specification" Nov. 15, 2002.*

Chengyuan Peng; Scalable Vector Graphics (SVG); Research Seminar on Interactive Digital Media; Fall, 2000.

Greg J. Badros, et al.; A Constraint Extension to Scalable Vector Graphics; UW Technical Report # 2000-08-04; Seattle, Washington.

Nigel McKelvey, et al.; XML Applications and How They Interact in a Multimedia Networking Environment.

* cited by examiner

SYSTEMS AND METHODS THAT UTILIZE SCALABLE VECTOR GRAPHICS TO PROVIDE WEB-BASED VISUALIZATION OF A DEVICE

RELATED APPLICATIONS

This application claims the benefit of U.S. Provisional Patent Application Ser. No. 60/520,267 filed on Nov. 14, 2003 and entitled "SYSTEMS AND METHODS THAT UTILIZE SCALABLE VECTOR GRAPHICS TO PROVIDE WEB-BASED VISUALIZATION OF A DEVICE," the entirety of which is incorporated herein by reference.

TECHNICAL FIELD

The present invention generally relates to industrial control systems, and more particularly to systems and methods that provide remote visualization of an industrial device via scalable vector graphics.

BACKGROUND OF THE INVENTION

The Internet can be referred to as a voluminous network of networks, or large-scale networking infrastructure that connects millions of computers to form a global network, wherein essentially any networked computer can communicate with another networked computer. Examples of common Internet communication include serving web pages, transmitting and receiving email, exchanging files, participating in usenets, searching for information, and instant messaging. The foregoing typically is achieved through conveying electronic information over the Internet via suitable protocols such as HyperText Transfer Protocol (HTTP), Simple Mail Transfer Protocol (SMTP), File Transfer Protocol (FTP), for example, employed in connection with a standard Internet protocol like Transmission Control Protocol/Internet Protocol (TCP/IP).

In general, HyperText Transfer Protocol (HTTP) is utilized for communication via the World Wide Web (the "Web") and defines how messages are formatted and transmitted and what actions Web servers and browsers should perform in response to various commands. For example, when a Uniform Resource Locator (URL) is provided and executed within an address bar of a web browser, an HTTP command is transmitted to a Web server that obtains and returns a requested Web page(s). Simple Mail Transfer Protocol (SMTP) is generally utilized for transmitting electronic mail (e-mail) messages between servers, wherein the messages can be retrieved with an e-mail client via Post Office Protocol (POP) or Internet Message Access Protocol (IMAP). In addition, SMTP is generally utilized to convey messages from an e-mail client to a mail server. File Transfer Protocol (FTP) is commonly utilized for exchanging files, for example, for downloading a file from a server to a client and/or uploading a file from a client to a server.

As the World Wide Web becomes more ubiquitous, Web-based interfaces are becoming a preferred means to remotely interact with systems and devices over networks (e.g., intranets, internets and the Internet). For example, Web-based interfaces (e.g., a Web page implemented with a Web browser) have been developed to monitor and control entities such as security systems, video/audio entertainment centers, electromechanical equipment, etc., as well as monitor internal and/or external locations. In another example, Web-based interfaces have been developed to facilitate communication with industrial systems and devices such as industrial controllers, for example.

Such Web-based interfaces typically include graphics, audio, text, video and the like and often require powerful rendering engines, banks of available memory, and proprietary software and hardware. In addition, many conventional systems comprise complex architectures, cannot be shared amongst third parties, consume resources for development and implementation, lack flexibility, consume processing power, and do not support many commonly utilized off-the-shelf software applications.

By way of example, to render a Web page with graphics conventional systems typically download and render one or more image files (e.g., GIF, TIF, BMP, JPEG, etc.); download and execute one or more Java applets and/or applications in connection with the Web browser; and/or download formatted information (e.g., PDF, word processing, etc.) that is displayed within one or more applications invoked within the Web browser. Downloading and utilizing such files and applications can consume bandwidth, processing cycles, time and memory and adds overhead. In addition, downloaded images generally are resolution dependent such that a specified image size is maintained rather than scaling the image to conform to an area of a viewing window; and thus, such images reduce Web page presentation flexibility. Moreover, the content within such image files typically cannot be searched or include active inks (e.g., hyperlinks) to other web sources.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to systems and methods that provide a simple remote Web-based interface to networked industrial devices. The novel interface is based on a scalable vector graphics (SVG) XML markup language, which is supported by many known Web browsers (e.g., via an SVG plug-in). Thus, the systems and methods of the present invention mitigate the need for proprietary software and/or hardware, specialized rendering engines and/or peripheral utilities such a Java applets and applications. In addition, SVG XML markup language provides for rendering (via basic ASCII drawing commands) resolution independent images that can include searchable graphics, text, labels, descriptions, etc., and links to other information; thus, employing SVG XML markup language can mitigate the need to download images and files with graphics and execute associated applications. The foregoing enables a user to represent a portion of a device, for example a device's faceplate, in an XML markup language file pursuant the SVG syntax, wherein a Web browser and/or an open source software package such as Adobe, Macromedia, etc. can be utilized to draw the portion of the device within a viewing window of the Web browser and/or an open source software package. In addition, the user can interact with the graphical representation to change values that effect device operation and/or monitor a device's performance.

In one aspect of the present invention, a system is provided that enables remote access to a device via a graphical depiction of various device features and/or related information based on a representation of the device embedded within an associated SVG file. The system includes a Web-based interface that can retrieve one or more Scalable Vector Graphics (SVG) XML markup language files generated for the device from a data store associated with the device. The retrieved SVG file can be executed locally in connection with the Web-based interface via ASCII drawing commands, wherein vector images can be created to render device-related graphics and/or text within the Web-based interface or an invoked open software package. Advantages of employing such a novel technique include reducing overhead and bandwidth requirements; mitigating downloading image files (e.g., BMP, GIF, TIF, JPG, etc.); mitigating downloading and executing applications such as Java applets; and rendering graphics that are resolution independent and searchable. The foregoing can be exploited within an industrial setting to visualize device (e.g., controller, PLC, etc.) related information (e.g., the device's faceplate) from a remote Web interface.

In another aspect of the present invention, a system for retrieving and executing an SVG file associated with a device is provided. The system includes a network manager that can be accessed via any Web-based interface. The network manager facilitates locating and retrieving SVG files, which can be subsequently executed within the Web-based interface and/or associated open software package such as Adobe and Macromedia applications. The SVG file can include instructions that can be executed via ASCII drawing commands to render graphical depictions of a device (e.g., a faceplate). A user can interact with the rendered depictions to observe device performance and effectuate device operation. The system can optionally include a firewall to provide secure communication between the Web-based interface and the device.

In yet another aspect of the present invention, exemplary user interfaces that can be employed in connection with various novel aspects of the invention are illustrated. A first user interface depicts a graphical representation of device information related to asset management maintenance. Such information can include: a region for noting device description, location, maintenance history, and device condition; a region to indicate equipment load information; a region that provides information related to fuel consumption; and a region that denotes performance. A second user interface depicts a graphical representation of device performance via a graph and device parameters, and a mechanism to load values and view information via a chart, for example.

In still another aspect of the present invention, methodologies are provided that provide access to device-related information from a remote Web interface. The methodologies include employing a Web-based interface to remotely obtain an SVG file associated with a device of interest, wherein the obtained file is subsequently executed to generate a graphical display illustrating various aspects of a device. A user can employ the rendered display to interact with the device, for example, to monitor (e.g., via charts graphs, values, etc.) and control (e.g., via loading parameters) performance. The SVG file can be executed locally via basic ASCII drawing commands, wherein vector images can be generated to render device-related graphics and/or text within the Web-based interface or an open software package.

In various other aspects of the present invention, intelligence can be employed to facilitate the system and methods. Such intelligence can include employing statistics, probabilities, inferences, and/or classifiers.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
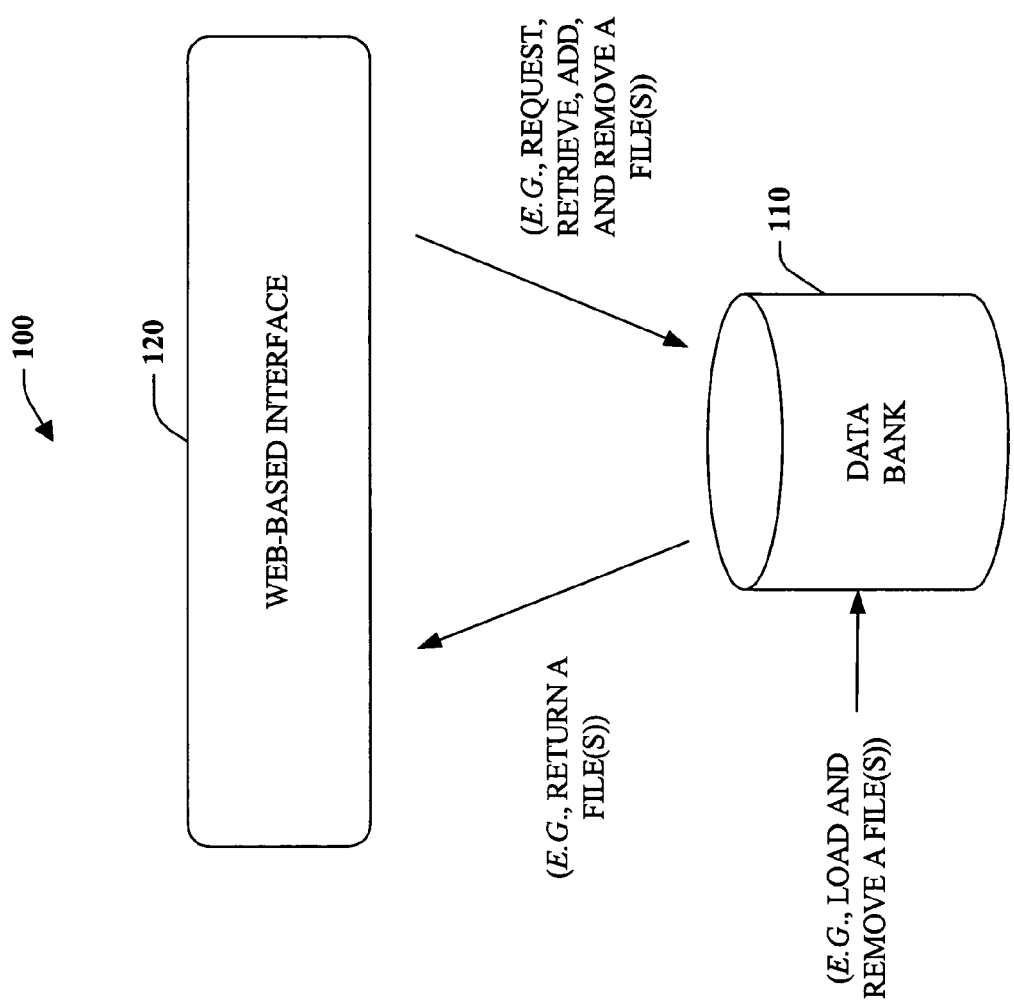
FIG. 1 illustrates an exemplary system that provides remote graphical access to device-related information, in accordance with an aspect of the present invention.

The present invention provides a novel Web-based approach to interact with devices within an industrial environment. The systems and methods employ an interface that is based on a scalable vector graphics (SVG), which is an XML markup language supported by installing an SVG plug-in in connection with known Web browsers. By way of example, a device's faceplate can be represented via an SVG file and stored with the device. A user can employ a Web browser from a remote location (e.g., via a Web client) to retrieve the SVG file, wherein the file can be loaded and executed within the Web browser and/or an open source software package (e.g., Adobe, Macromedia, etc.) in connection with the Web browser. Execution can comprise rendering an interactive faceplate that can include illustrations of LEDs, alphanumeric displays, inputs, output, etc., trending mechanisms (e.g., graphs, charts, etc.), and capabilities to change values that effectuate device performance. In another example, ladder logic can be additionally and/or alternatively represented within an SVG file.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used herein, the terms "component," "device," "controller," and the like are intended to refer to a computer-related entity, either hardware, a combination of hardware and software, software, or software in execution. For example, a component can be, but is not limited to, a process running on a processor, a processor, an object, an executable, a thread of execution, a program, a microprocessor, a processing unit and/or a computer. In addition, one or more components can reside within a process and/or thread of execution and a component can be localized on a computer and/or distributed amongst a plurality of computers. Furthermore, such components can be executed within various computer readable media, wherein respective media can be associated with disparate data structures. Moreover, such components can communicate via local and/or remote processes, for example, in accordance with a signal with one or more data packets (e.g., data from a component interacting with another component in a local system, distributed system, and/or across a network such as the Internet with other systems via the signal).

FIG. 1 illustrates a system 100 that provides access to device-related information from a Web-based interface, in accordance with an aspect of the present invention. The system 100 comprises a data bank 110 that can store files with embedded device-related information and a Web-based interface 120 that can retrieve one or more files from the data bank 110 and can facilitate rendering the information for presentation to a user.

As briefly noted, the data bank 110 can be utilized to store files that include device-related information. Such files can be XML-based and typically are created utilizing XML markup language Scalable Vector Graphics (SVG) syntax. Employing SVG provides a mechanism wherein graphics (e.g., two and three dimensional images) and/or text can be represented within a file that can be executed via simple ASCII drawing commands in order to display the graphics and/or text within the Web-based interface. In general, SVG enables vector images to be generated through text-based commands formatted to comply with XML specifications.

Thus, a remote user can access the data bank 110, retrieve an SVG file associated with a device of interest, and render the SVG file in connection with the remote Web-based interface 120 via ASCII drawing commands. Advantages of employing SVG include resultant graphics that are resolution independent such that the graphics can be scaled to conform to a viewing window and can include searchable information. The foregoing can be exploited within an industrial setting, wherein a device's faceplate can be represented within an SVG file and subsequently obtained and rendered to present a dynamic faceplate to a user through a remote Web interface. Such a faceplate can be a virtual representation of the device's physical faceplate, including LEDs, alphanumeric displays and/or other visual indications of the devices status and operations. In addition, the faceplate can be automatically updated (e.g., in real-time) to reflect the actual state of the physical faceplate.

Conventionally, device-related graphics are provided via images (e.g., GIF, JPG, TIF, BMP, etc.) that are downloaded to a remote Web interface, which can consume bandwidth and memory and increase overhead. In addition, such downloaded images typically cannot be searched and are resolution dependent, wherein the viewable size is defined and cannot be scaled according to a display window. In many instances, applications such as Java applets and/or applications are additionally or alternatively downloaded and executed to render graphics. Such applications can likewise consume bandwidth and memory and increase overhead. Moreover, such images and/or Web applications can require specialized software and/or hardware, rendering engines and/or peripheral utilities. Thus, the present invention provides a novel approach that can improve conventional techniques for displaying graphic Stored SVG files can be managed within the data bank 110 via various techniques. For example, in one aspect of the present invention a user can generate an SVG file(s) for a device and subsequently load the SVG file(s) to the data bank 110. For example, the user can establish a connection to the data bank 110 and save the file within the data bank 110. In another example, the data bank 110 can be configured to periodically check for newly created and/or updated SVG files (e.g., dynamically generated), and if such a file is located, the SVG file can be automatically retrieved and stored within the data bank 110. In yet another instance, SVG files can be loaded to the data bank 100 from portable media such as CD, DVD, optical disk, tape, floppy disk, flash memory, and the like. In still another instance, wireless technology can be employed to transfer a SVG file to the data bank 110. It is to be appreciated that rather than retrieving such information from the data bank 110, a stream(s) of SVG information can be conveyed.

In another aspect of the present invention, a user can remove a SVG file(s) from the data bank 110 via similar mechanisms. For example, the user can establish a connection to the data bank 110 and delete a SVG file stored within the data bank 110. In another example, the data bank 110 can be configured to periodically remove outdated and/or unused SVG files. In yet another instance, an uninstall utility can be employed to selectively and automatically remove SVG files from the data bank 110. It is to be appreciated that standard security mechanisms (e.g., login, password, etc.) can be employed to enable the adding and/or removing of files, as well as other common actions such as viewing, editing, etc.

The Web-based interface 120 can be utilized to access SVG files stored within the data bank 110. Thus, a user can employ the Web-based interface 120 to add and/or remove SVG files from the data bank 110. In addition, the user can employ the Web-based interface 120 to retrieve an SVG file from the data bank 110 and subsequently execute the SVG file, wherein execution can include rendering a graphical display that depicts various aspects of the device (e.g., an associated faceplate) and includes mechanisms to observe performance and change values that effectuate device operation. As noted previously, utilizing SVG syntax enables execution via basic ASCII drawing commands. Thus, an SVG XML-based file can be obtained and locally executed to draw graphics, which can mitigate the overhead and expense of downloading image files (e.g., BMP, GIF, TIF, JPG, etc.). It is to be appreciated that the remote Web-based interface 120 can be a Web browser and/or open software package such as an Adobe, Macromedia, etc. software application, as described in detail below.

In one aspect of the present invention, the system 100 can be employed in an industrial environment. For example, an SVG file can be generated for an industrial device (e.g., controller, PLC, etc.) and stored within the data bank 110 and/or dynamically generated via a stream of information. A user can employ a Web client to access a network associated with the device. Such access can be over an intranet, an internet and/or the Internet and can be through wire, optical, IR or RF technologies, for example. The user can launch the remote Web-based interface 120 and utilize the remote Web-based interface 120 to access the data bank 120, wherein the user can retrieve an SVG file associated with the industrial device. The SVG file can be executed to render the file content within a display associated with the remote Web-based interface 120 and/or within an associated application (e.g., plugins for Adobe, Macromedia, etc.). Such rendering can be an interactive graphical representation that is updated in real-time. The user can interact with the device via the rendering in order to view device-related information (e.g., performance, manuals, history, etc.) and/or effectuate the device's operation. In addition, the user can capture and save screens, for example, for future playback and/or analysis, and/or operator actions.

It is to be appreciated that a typical industrial device that can be represented to a user via an SVG file comprises a plurality of modules (e.g., a programmable logic controller, or PLC) such as a control module(s), an interface module(s) and an I/O module(s) utilized in connection with electrical, mechanical, hydraulic and pneumatic systems and processes. Control commonly is achieved via virtual relays, contactors, counters, timers and other means through hardware, software and/or firmware that can be user (e.g., user written, application specific code) configured. I/O provides a mechanism for communication between systems and the environment. For example, an input channel can be employed to receive analog and digital signals through sensors, switches and the like that provide information indicative of state(s) (e.g., on/off) and/or relating to a process(s). An output channel can be employed to convey a next state to an instrument under the control of the controller. Such industrial devices can be utilized to semi and/or fully automate factories.

Figure 2:
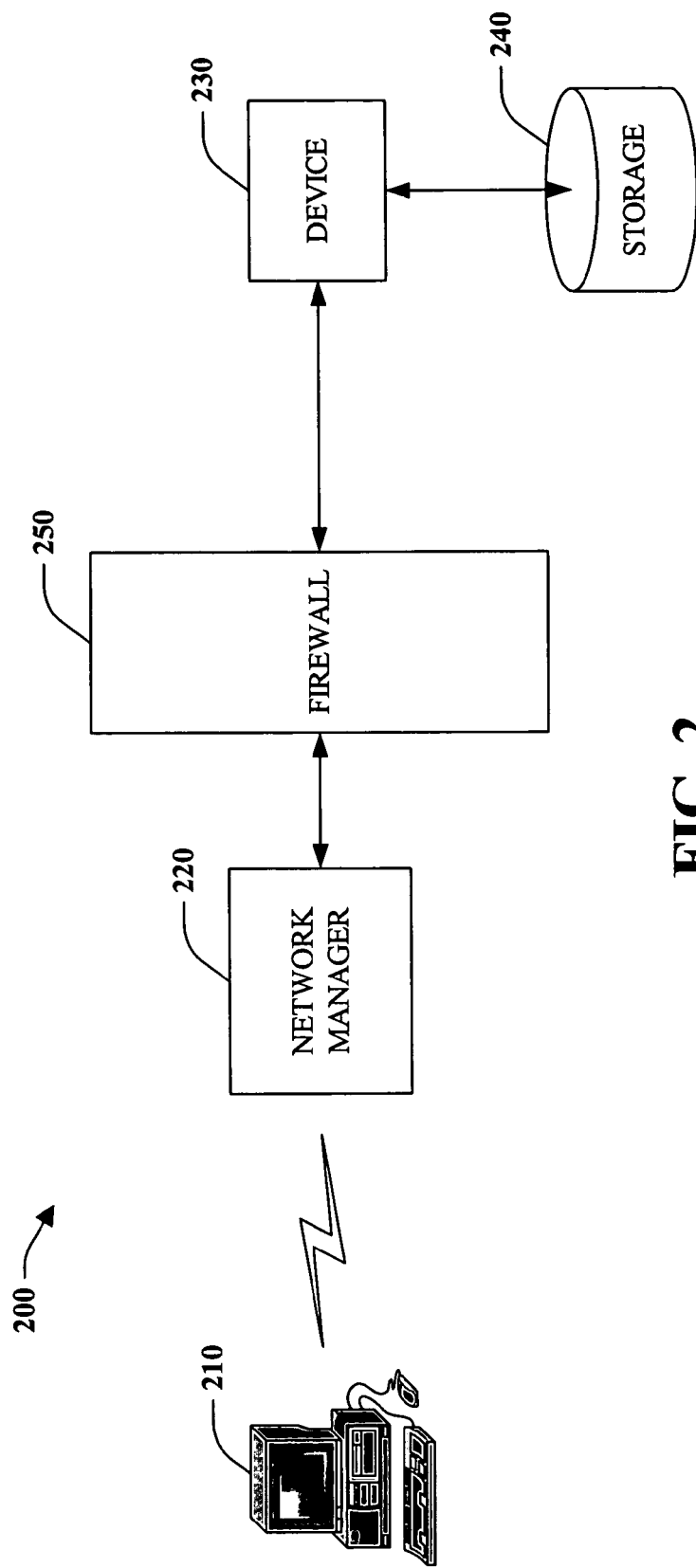
FIG. 2 illustrates an exemplary system that renders device-related information within a Web-based interface associated with a remote Web client, in accordance with an aspect of the present invention.

FIG. 2 illustrates a system 200 that renders device-related information within a Web-based interface associated with a remote Web client, in accordance with an aspect of the present invention. The system 200 can be interfaced to a Web client 210 that can be provided with access to device-related information via a network manger 220. The Web client 210 can be essentially any microprocessor-based system that can interface with a network. For example, the Web client 210 can be a personal computer (e.g., desktop, mini-tower and tower), a mainframe computer, a laptop, a notepad, a palm pilot, a handheld, a tablet PC, a personal data assistant, cell phone, a terminal (e.g., "dumb" terminal), an HMI, and the like. In addition, the Web client 210 can include off-the-shelf and/or specialized (e.g., proprietary) software and/or hardware such as accelerators, dedicated processing chips and high-speed communication channels that can increase performance, enhance user capabilities, increase transmission and rendering rates and improve aesthetics. Furthermore, firmware can be utilized to provide low-level executable instructions, parameters and/or control code, and provide a flexible means to upgrade and/or revise hardware functionality and performance.

A user can invoke a Web-base interface from the Web client 210, wherein the Web-based interface can facilitate interaction between the Web client 210 and any device residing on an available network. The Web-based interface can comprise an application or a portion of an application executing in connection with one or more components. For example, the Web-based interface can be code executing within one or more of the aforementioned microprocessor-based components, wherein the code can reside in local memory such as any suitable type of RAM or ROM, virtual memory, hard disk, etc. and/or an external storage such as CD, DVD, optical disk, floppy disk, tape, memory stick, portable hard drive, etc.

In one aspect of the present invention, the Web-based interface can be a graphical user interface (GUI) or Web browser. As such, the Web-based interface can comprise mechanisms (e.g., input and output) that facilitate communication and/or interaction over a network. For example, the Web-based interface can comprise text and/or graphic presenting (e.g., output) regions comprising dialogue boxes, static controls, drop-down-menus, list boxes, pop-up menus, and graphic boxes. The presenting regions can further include utilities to facilitate display. For example, the presenting regions can include vertical and/or horizontal scroll bars to facilitate navigation and toolbar buttons to determine whether a region will be viewable, and to adjust zoom, orientation and/or color/gray scale. A user can interact with the presenting regions to view, select and provide information via various devices such as a mouse, a roller ball, a keypad, a keyboard, a pen and/or voice activation, for example.

Input regions utilized to transmit information can employ similar mechanisms (e.g., dialogue boxes, etc.) and, in addition, utilities such as edit controls, combo boxes, radio buttons, check boxes and push buttons, wherein the user can employ various input devices (e.g., the mouse, the roller ball, the keypad, the keyboard, the pen and/or voice activation) in connection with the mechanism and utilities. For example, the user can provide a parameter or variable, or pointer thereto (e.g., a register location) via entering the information into an edit control box and/or highlighting an associated check box. Typically, a mechanism such as a push button is employed subsequent to entering the information in order to initiate conveyance of the information. However, it is to be appreciated that the invention is not so limited. For example, merely highlighting the check box can initiate information conveyance.

The input and output mechanisms can be employed for various communication such as email, chat room, instant messaging, etc. In addition, URLs and/or hyperlinks can be utilized to locate and/or specify locations of information. Help files, debuggers, troubleshooting documentation and/or automatic event (e.g., error) loggers can be linked for manual and/or automatic invocation. Applications such as word processors, data analysis, scheduling utilities, project planners, etc. can be launched from drop-down menus, shortcuts and/or buttons.

In addition or alternatively, the Web-based interface can include command-line functionality. For example, a command line can be employed to prompt for information via a text message and/or audio tone. The operator can then provide suitable information, such as alpha-numeric input corresponding to an option provided in the interface prompt or an answer to a question posed in the prompt. In another aspect of the present invention, a value, set of values or a stream of values can be presented to the user in the command line interface.

It is to be appreciated that the Web-based interface can be generated in connection with an application programmer interface (API). As known, APIs facilitate building software applications via a set of routines, protocols, and tools, wherein developers and/or programmers can employ the API to construct customized applications consistent with the operating environment and a user(s) needs. In one aspect of the present invention, an SDK programming package, which typically includes one or more APIs and programming tools (including documentation), can be employed to develop the Web-based interface.

The Web client 210 can utilize the Web-based interface to communicate with the network manger 220. The network manager 220 can facilitate locating a device 230 (e.g., an industrial device, as described above) and conveying information (e.g., an SVG-based file) between the Web client 210 and the device 230 and/or associated storage. For example, the Web-based interface can upload and/or download SVG files, streams of SVG information, manuals, history files, and the like from/to the device 230 via the network manager 220. As described previously, an SVG file and/or stream of SVG information can include instructions for rendering graphics that depict various aspects of a device, wherein the instruction can be executed via basic ASCII commands. Thus, the Web-based interface can be employed to obtain and render an SVG file that depicts dynamic graphical aspects (e.g., a faceplate, LEDs, alphanumeric displays, state, status, inputs, output, etc., trending mechanisms (e.g., graphs, charts, etc.), and capabilities to change values that effectuate device performance) of the device 230. The foregoing provides an improvement over conventional techniques, wherein graphics generally are downloaded as image files. Moreover, and unlike downloaded image files, graphics rendered from a SVG file are resolution independent and can be scaled to a display window and can be searched for text and other alphanumeric characters.

The storage component 240 can be utilized to save device-related SVG files. The storage component 240 can be any known storage element. For example, it can be local memory. For example, it can include storage associated with a hard drive, RAM, ROM, a memory module, flash, CD, DVD, and the like. In addition, it can include shared, or common storage such a networked server and/or database that is local to an associated network. Remote storage can include remote servers, databases and/or other devices.

A firewall 250 can be utilized to provide a secure interface to the device 230 and storage component 240. For example, the firewall 250 can ensure that only authorized users access the device 230 and storage component 240. It is to be appreciated that any known firewall technique can be employed in accordance with an aspect of the present invention. For example, in one instance, a logon and password can be utilized to facilitate security. In another instance, user characteristics such as a fingerprint, a facial characteristic, and/or an iris map can be employed. Moreover, it is to be appreciated that the device 230 can provide for security, for example, requiring a login and/or password in order to gain access.

Figure 3:
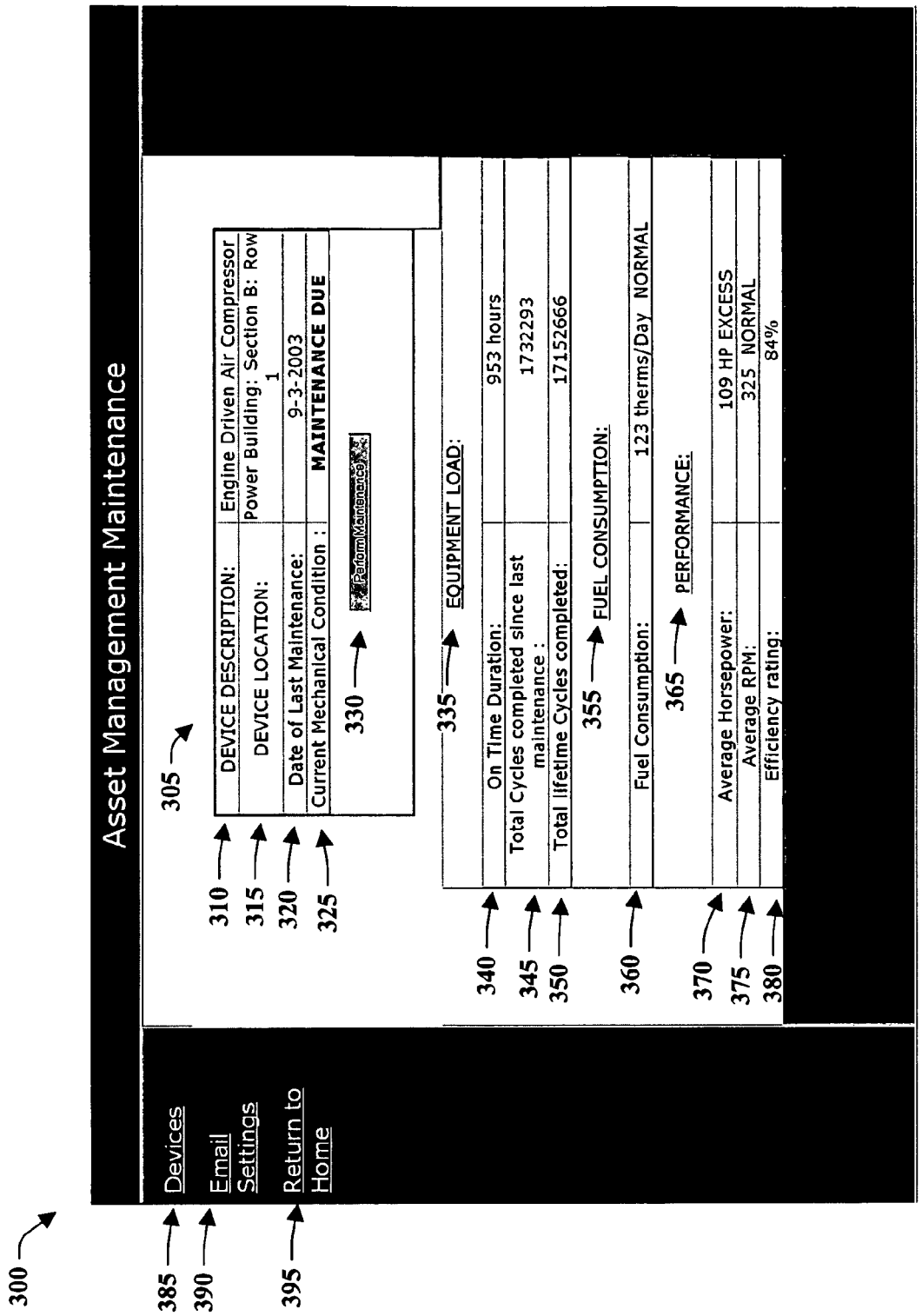
FIG. 3 illustrates a first exemplary SVG-based interface, in accordance with an aspect of the present invention.
Figure 4:
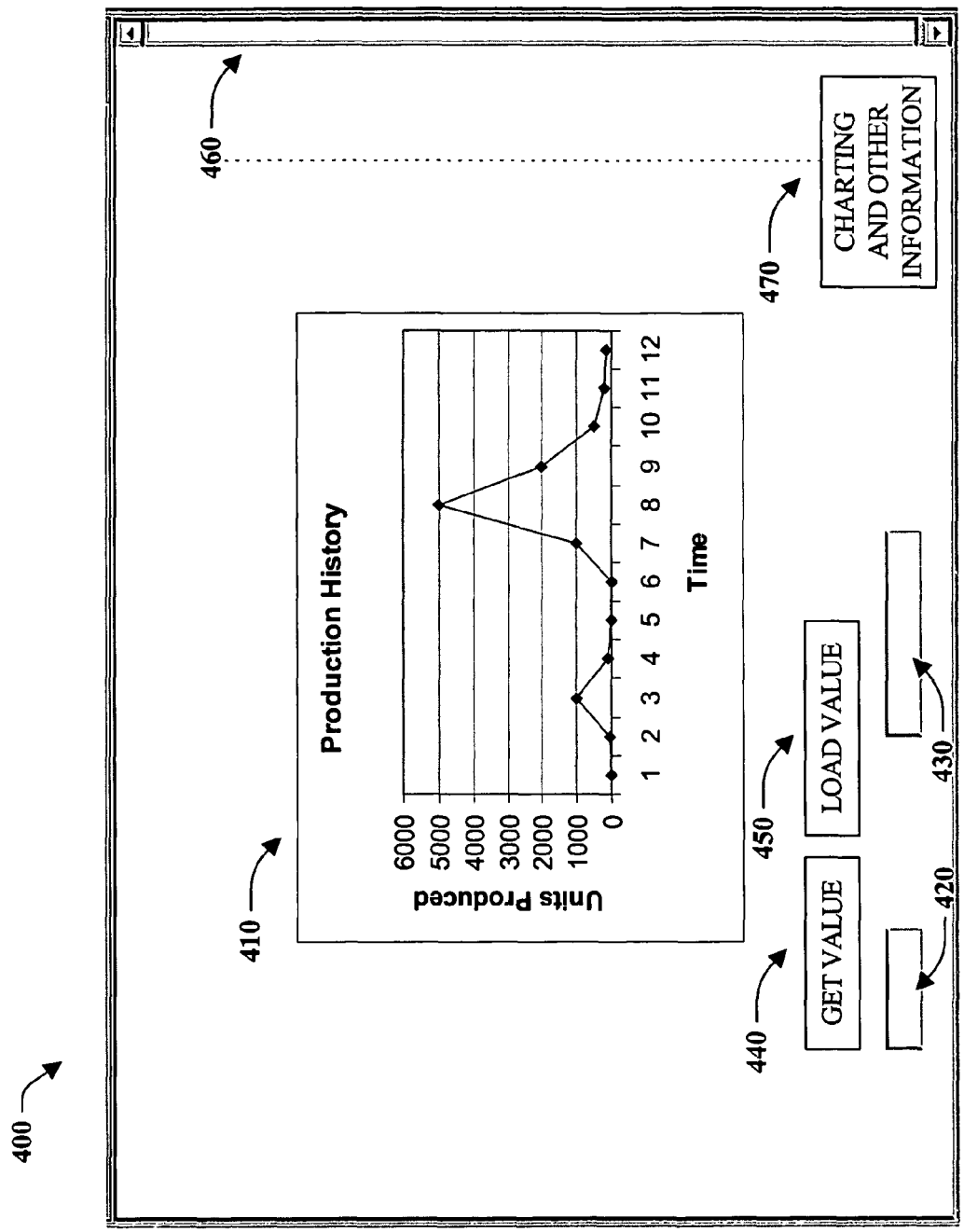
FIG. 4 illustrates a second exemplary SVG-based interface, in accordance with an aspect of the present invention.

FIGS. 3 and 4 illustrate exemplary user interfaces that can be employed in connection with the novel aspect of the present invention. It is to be appreciated that such interfaces are provided for illustrative purposes and are not limitative. Thus, various other user interfaces can be employed in accordance with an aspect of the present invention.

Proceeding to FIG. 3, an exemplary user interface 300 that can be employed in connection with the novel aspect of the present invention is illustrated. As depicted, the exemplary user interface 300 provides device information related to asset management maintenance. For example, user interface 300 comprises a region 305 with a plurality of entries for device description, location, maintenance history, and device condition. A device description entry 310 can be utilized to provide a brief narrative (e.g., Engine Driven Air Compressor) of the device; a device location entry region 315 can be utilized to provide the building (e.g., Power Building), section (e.g., Section B), and row (e.g., Row 1), for example, where the device can be found; a last maintenance entry 320 can be utilized to provide a history (e.g., Sep. 3, 2003) of when the last maintenance was performed and a device condition entry 325 that can indicate whether the device is due for maintenance (e.g., MAINTENANCE DUE). In addition, the region 305 can include a maintenance invocation mechanism 330 that allows a user to manually initiate device maintenance.

The user interface 300 further comprises a region 335 with a plurality of entries that provide equipment load information. An on time duration entry 340 can be utilized to provide a time in hours, minutes and/or seconds (e.g., 953 hours); a cycles completed entry 945 can be utilized to indicate the total number of cycles completed (e.g., 1732293) since the last maintenance; and a total cycles completed entry 950 can be utilized to indicate the lifetime number of cycles completed (e.g., 1752666). The user interface 300 further comprises a region 355 that provides information related to fuel consumption. A fuel consumption entry 360 can be utilized to indicate the fuel consumed during a year, month, day, etc. (e.g., 123 therms/Day), as well as additional information such as whether the amount of consumption is normal (e.g., NORMAL). The user interface 300 further comprises a region 365 that indicates performance. A power entry 370 can be utilized to denote the power expended (e.g., 109 HP) and whether such expenditure is normal (e.g., EXCESS); a speed entry 375 can be utilized to indicate the average speed (e.g., 325) and whether such speed is normal (e.g., NORMAL); and a rating entry 380 that can be utilized to denote the efficiency rating (e.g., 84%). In addition, the user interface 300 can further comprise a device selecting mechanism 385, an emailing mechanism 390 and a return to home mechanism 395.

FIG. 4 illustrates an exemplary user interface 400 that can be employed in connection with the novel aspect of the present invention is illustrated. As depicted, the exemplary user interface 400 illustrates device performance via a graph 410 and device parameters. The graph 410 can represent process history. For example, a Y axis (ordinate) can be utilized to indicate the number of units processed and an X axis (abscissa) can be utilized to determine the number of units processed throughout a day. A value 420 and a value 430 can be automatically retrieved via a get mechanism 440 or manually set via a load mechanism 450. In addition, a scroll bar 460 is provided to navigate through a display that is larger than the viewable area. The user interface 400 further comprises a mechanism 470 that provides a link to additional information.

Figure 5:
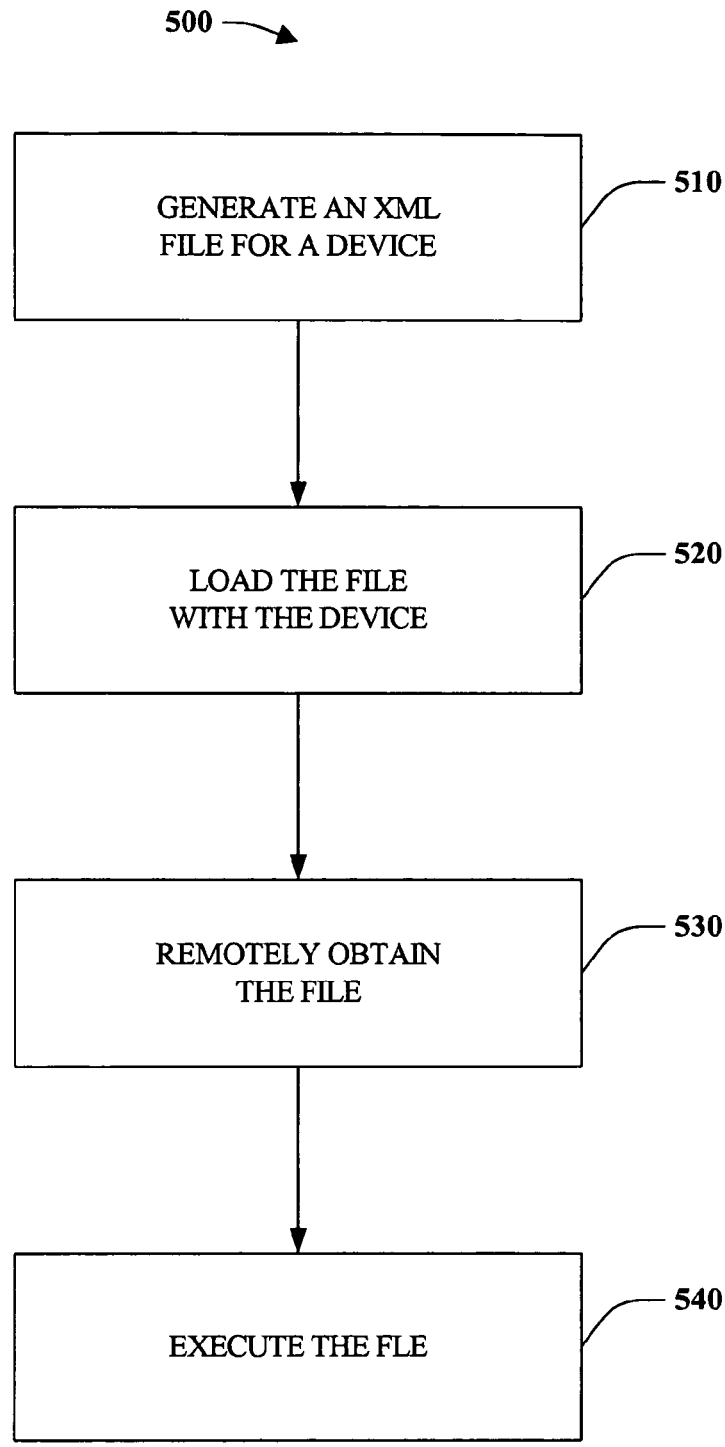
FIG. 5 illustrates an exemplary methodology that executes device SVG files within a Web interface, in accordance with an aspect of the present invention.
Figure 6:
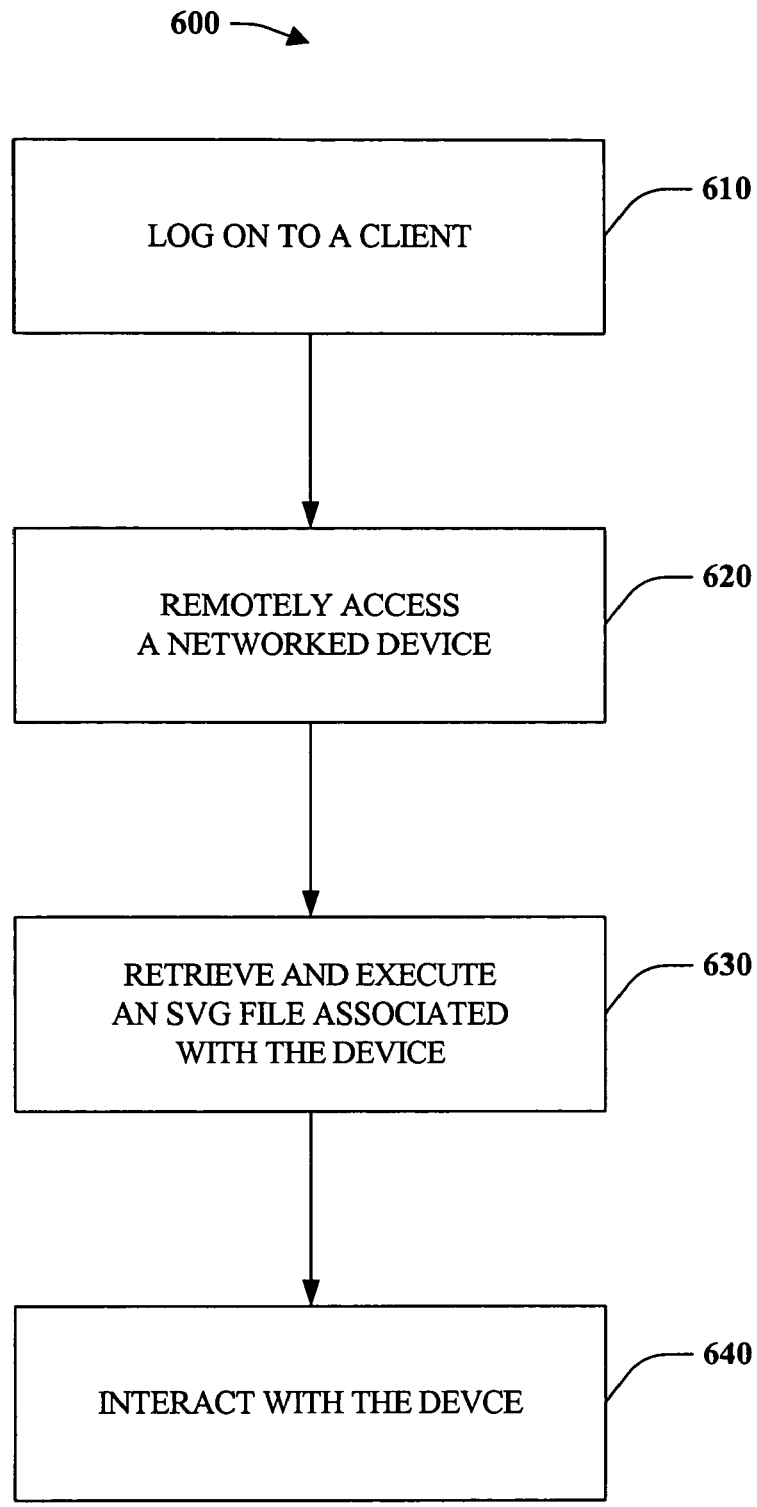
FIG. 6 illustrates an exemplary methodology that renders graphics associated with an SVG file to provide a user a mechanism to interact with a device from a Web interface, in accordance with an aspect of the present invention.

FIGS. 5 and 6 illustrate methodologies, in accordance with an aspect the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to FIG. 5, a methodology 500 is illustrated that provides access to device-related information from a remote Web interface, in accordance with an aspect of the present invention. It is to be appreciated that the system 500 can be employed within an industrial setting to remotely visualize a device (e.g., performance, a faceplate, etc.) utilizing Scalable Vector Graphics (SVG).

At reference numeral 510, an SVG XML file is generated for a device. As described supra, utilizing the XML markup language Scalable Vector Graphics (SVG) syntax provides for representing device graphics as well as text within a file that can be executed via ASCII drawing commands at a client machine. Thus, a remote user can retrieve a device's SVG file via a Web browser and render interactive graphics and/or text within the browser rather than download one or more graphics files (e.g., GIF, JPG, TIF, etc.) and/or executable applications such as Java applets and/or applications. Such graphics can be refreshed to provide the user with a representation that reflects the actual state of the physical entity graphically depicted. In addition, the rendered graphics can be searched and include links to other files. Moreover, the rendered graphics can be resolution independent, wherein a user and/or an automatic mechanism can scale the graphics within a viewing region. The foregoing provides for various benefits over conventional systems and techniques, as described in detail above.

At 520, the generated SVG file can be stored with the device. As noted above, various mechanisms can be employed to transfer an SVG file to storage associated with the device. For example, the SVG file can be locally and/or remotely uploaded, downloaded and/or removed. In addition, manual and/or automatic techniques can be employed. At reference numeral 530, a user can access the SVG file from a Web interface. For example, a user can log on to a Web client, establish a session with a network, launch a network browser, and obtain the SVG over the network.

At 540, the user can execute the SVG file. The executed file can provide the user with device related information such as performance and graphical representations of the device. The user can interact with the graphical display to obtain device information and effect parameters that can alter device performance. It is to be appreciated that retrieving such files and configuring values can be facilitated via intelligence. For example, the intelligence can be employed to facilitate determining what information may be important to the user and how to display information. In addition, the intelligence can be employed to facilitate determining parameter changes. Moreover, the intelligence can be employed to facilitate searching and returning results, including sorting and/or filtering the data. Such intelligence can render decisions automatically and/or semi-automatically, wherein the user can be prompted to participate in various aspects of decision-making. It is noted that the intelligence can be based on statistics, probabilities, inferences and classifiers (e.g., explicitly and implicitly trained), including Bayesian learning, Bayesian classifiers and other statistical classifiers, such as decision tree learning methods, support vector machines, linear and non-linear regression and/or neural networks can be employed in accordance with an aspect of the present invention.

FIG. 6 illustrates a methodology 600 to interact with a device via information graphically rendered within a Web interface, in accordance with an aspect of he present invention. At reference numeral 610, a user logs on to a client with access to a network associated with a device the user desires to interact with over the network. The client can be virtually any microprocessor-based system (as describe in detail above).

The client can include a network browser that facilitates communication over a network. At 620, the user can employ the network browser to access a device residing on the network. In many instances, the device will be associated with a security mechanism, which can be utilized to prevent unauthorized users from accessing the device. At reference numeral 630, the user can download an SVG file associated with the device, wherein the instructions within the SVG file can be executed to render graphical and/or textual information within the network browser. At 640, the user can interact with the device via the graphical and/or textual display to obtain performance-related information and/or effect operation.

Figure 7:
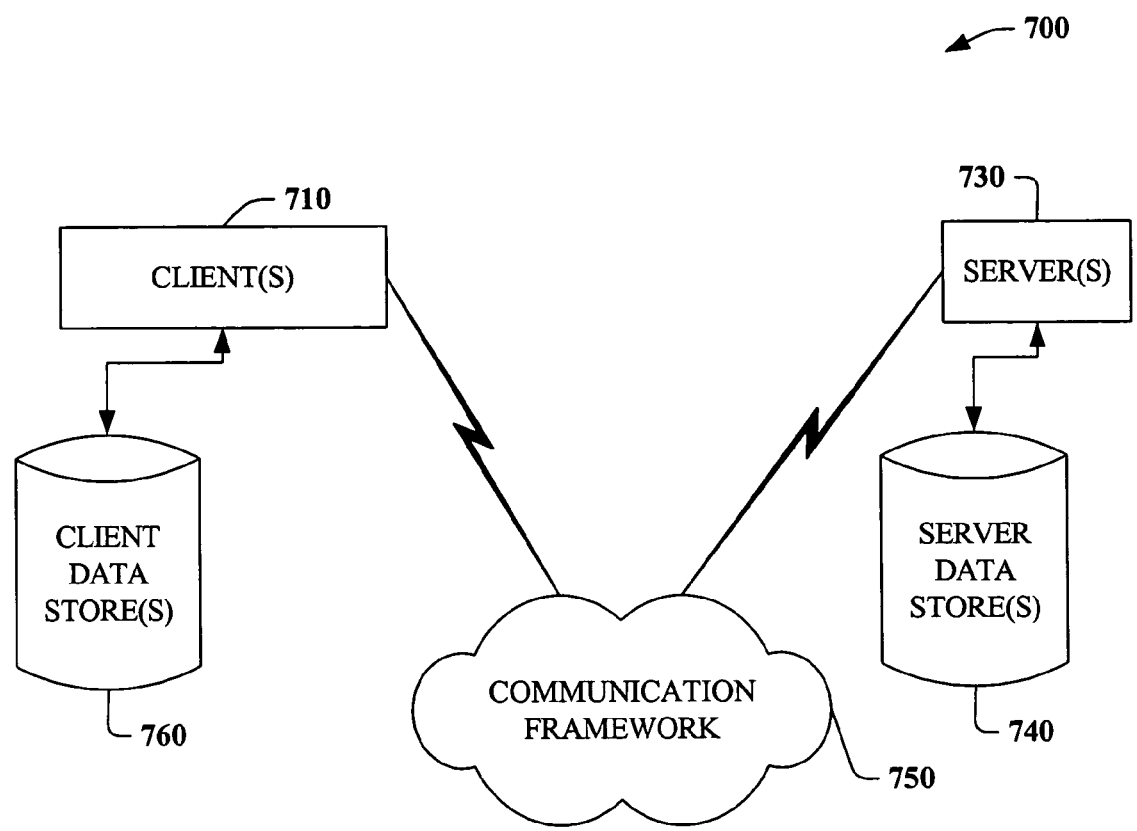
FIG. 7 illustrates a first exemplary environment wherein the novel aspects of the invention can be employed.
Figure 8:
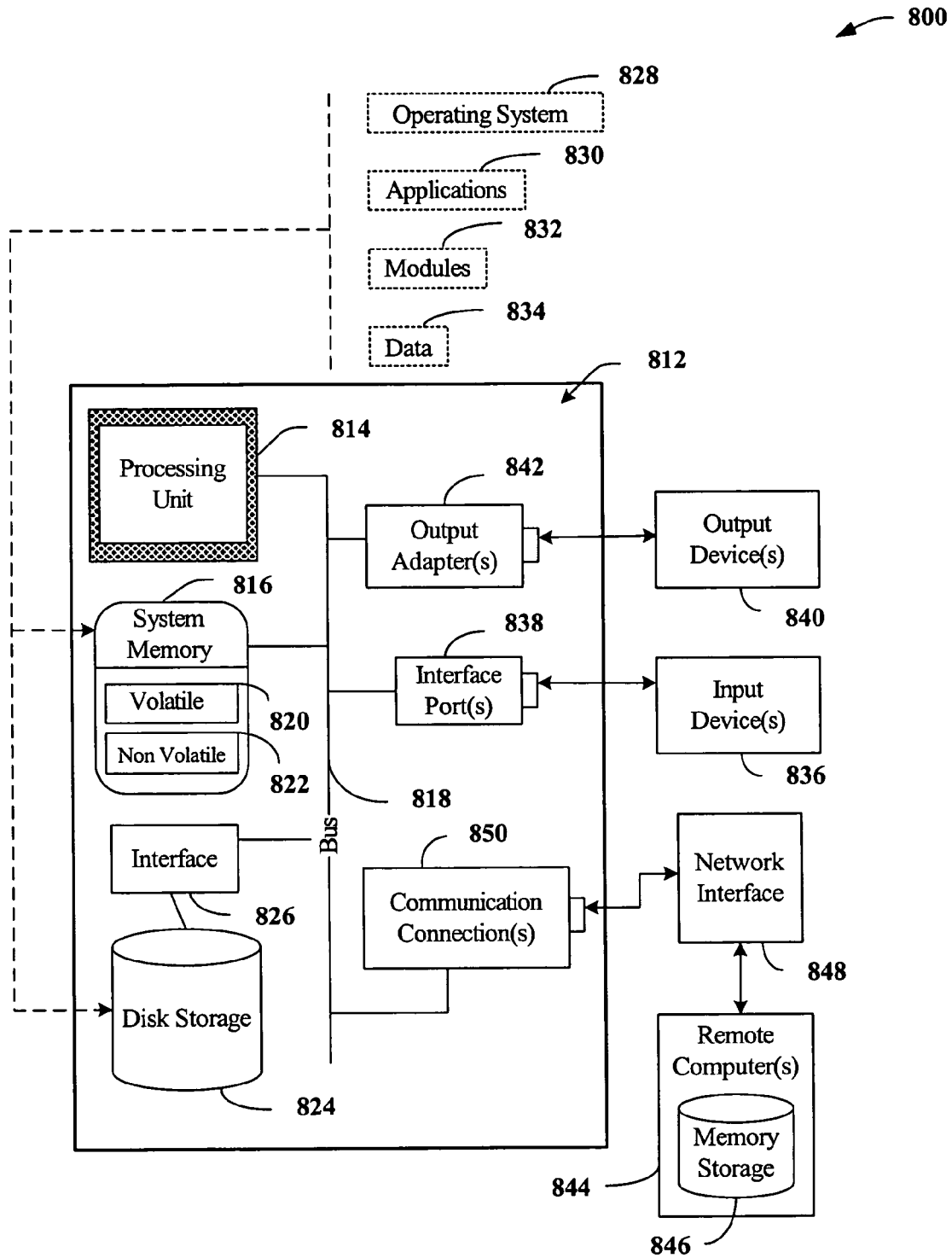
FIG. 8 illustrates a second exemplary environment wherein the novel aspects of the invention can be employed.

In order to provide a context for the various aspects of the invention, FIGS. 7 and 8 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

FIG. 7 is a schematic block diagram of a sample-computing environment 700 with which the present invention can interact. The system 700 includes one or more client(s) 710. The client(s) 710 can be hardware and/or software (e.g., threads, processes, computing devices). The system 700 also includes one or more server(s) 730. The server(s) 730 can also be hardware and/or software (e.g., threads, processes, computing devices). The servers 730 can house threads to perform transformations by employing the present invention, for example. One possible communication between a client 710 and a server 730 can be in the form of a data packet adapted to be transmitted between two or more computer processes. The system 700 includes a communication framework 750 that can be employed to facilitate communications between the client(s) 710 and the server(s) 730. The client(s) 710 are operably connected to one or more client data store(s) 760 that can be employed to store information local to the client(s) 710. Similarly, the server(s) 730 are operably connected to one or more server data store(s) 740 that can be employed to store information local to the servers 730.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844.

Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for remote visualization of a device's faceplate, comprising:
   a processor;
   a data store associated with an industrial device configured to store a Scalable Vector Graphics (SVG) file, the SVG file including data representative of the industrial device's physical faceplate; and
   a memory communicatively coupled to the processor, the memory having stored therein computer-executable instructions configured to implement the system, including:

a delivery component configured to deliver the SVG file to a Web browser of a client device in response to a request from the client device, wherein the SVG file is configured to, in response to execution, render an interactive graphical representation of the industrial device's faceplate within a the Web browser, the interactive graphical representation allowing remote monitoring and modification of at least one parameter associated with the industrial device via the Web browser; and a component configured to use one or more of a statistic, a probability, an inference, or a classifier to facilitate at least one of location of the SVG file, execution of the SVG file, or interaction with the industrial device via the interactive graphical representation.

2. The system of claim 1, wherein the SVG file comprises a set of data embedded within an extensible markup language (XML) file.

3. The system of claim 1, wherein the SVG file is obtained in real-time from the industrial device.

4. The system of claim 1, wherein the data store is configured to periodically check for one or more outdated SVG files, and remove the one or more outdated SVG files in response to identification of the one or more outdated SVG files.

5. The system of claim 1, wherein the SVG file is configured to render the graphical representation within an open software package associated with the Web browser.

6. The system of claim 5, wherein the open software package comprises a plug-in for the Web browser.

7. The system of claim 1, wherein the graphical representation provides for viewing, recording, and controlling operation of the industrial device.

8. The system of claim 1, wherein the graphical representation is configured to dynamically update to reflect a current state of the industrial device.

9. The system of claim 1, wherein the graphical representation comprises one or more of a light emitting diode (LED), an alphanumeric display, a state, a status, an input value, or an output value.

10. The system of claim 1, wherein the graphical representation further depicts one or more of a chart or a graph that depicts a performance of the industrial device.

11. The system of claim 1, wherein the graphical representation is storable for future analysis.

12. The system of claim 1, wherein the industrial device comprises an industrial controller.

13. A system that provides access to a device from a remote Web interface, comprising:
a processor;
a memory communicatively coupled to the processor and configured to maintain Scalable Vector Graphics (SVG) data relating to the industrial device, the memory having stored therein computer-executable instructions configured to implement the system, including:
a data conveying component configured to stream the SVG data to a network browser of a client device, wherein the SVG data is configured to generate an interactive graphical depiction of the industrial device on the network browser, the interactive graphical depiction allowing monitor and modification of at least one operational parameter within the industrial device; and
a component configured to use one or more of a statistic, a probability, an inference, or a classifier to facilitate at least one of location of the SVG data, execution of the SVG data, or interaction with the industrial device via the interactive graphical depiction.

14. The system of claim 13, wherein the SVG data is created using a Scalable Vector Graphics extensible markup language (XML).

15. The system of claim 13, further comprising an interface component configured to couple the data conveying component to the industrial device.

16. The system of claim 13, further comprising a firewall configured to provide secure communication between the network browser and the industrial device.

17. The system of claim 13, wherein the industrial device is an industrial controller.

18. The system of claim 13, wherein the interactive graphical depiction comprises a virtual interactive representation of a physical faceplate associated with the industrial device.

19. The system of claim 18, wherein the virtual interactive representation of the physical faceplate comprises one or more of a light emitting diode (LED), an alphanumeric display, a status, a state, an input value, or an output value.

20. The system of claim 13, wherein the interactive graphical depiction is configured to display device performance information in one or more of a chart, a graph, or one or more values.

21. The system of claim 13, wherein the interactive graphical depiction includes a manual associated with the industrial device.

22. The system of claim 13, wherein the SVG data is configured to dynamically update the interactive graphical depiction to reflect a current state of the industrial device.

23. The system of claim 13, wherein the interactive graphical depiction conveys at least one of a location of the industrial device, a maintenance history of the industrial device, a condition of the industrial device, an indication of a number of work cycles completed by the industrial device, an amount of fuel consumed, an amount of power consumed, or a speed indication.

24. A method for interacting with an automation device through a remote interface, comprising:
using a processor to facilitate execution of computer-executable instructions stored in memory to perform acts, comprising:
creating a Scalable Vector Graphics (SVG) file that represents at least one aspect of the automation device;
storing the SVG file with the automation device;
receiving a request from a client device for the SVG file;
sending the SVG file to a Web browser associated with the client device in response to the receiving;
executing instructions embedded within the SVG file at the Web browser to facilitate generating an interactive graphical representation of the at least one aspect of the automation device within the Web browser, the interactive graphical representation facilitating remote monitoring and modification of at least one operational parameter of the automation device; and
based on one or more of a statistic, a probability, an inference, or a classifier, at least one of locating the SVG file, executing the SVG file, or interacting with the automation device via the interactive graphical representation.

25. The method of claim 24, further comprising employing an open software package in connection with the Web browser to display the interactive graphical representation.

26. A computer-implemented method that renders device-related graphics from streamed Scalable Vector Graphics (SVG) information within a Web-based interface, comprising:

receiving a request from a remote client for an SVG file associated with an industrial device;

sending the SVG file from a computer-readable storage medium associated with the industrial device to a Web browser associated with the remote client;

executing the SVG file within the Web browser to draw a dynamically updated interactive graphic of the industrial device;

displaying a real-time status of at least one parameter associated with the industrial device and allowing remote modification of the at least one parameter through the interactive graphic; and as a function of at least one of a statistic, a probability, an inference, or a classifier, at least one of locating the SVG file, executing the SVG file, or interacting with the industrial device via the interactive graphic.

27. The method of claim 26, further comprising generating the SVG file with information related to a physical faceplate of the industrial device.

28. A computer-readable medium having stored thereon computer-executable instructions that, in response to execution, cause a computing system to perform operations, including:

sending a Scalable Vector Graphics (SVG) file with device-related information from a computer-readable storage medium associated with an industrial device to a client device in response to receiving a request from the client device, the SVG file configured to generate an interactive graphical representation of the industrial device that allows viewing and modifying of at least one operational parameter within the industrial device; and employing one or more of a statistic, a probability, an inference, or a classifier to at least one of locate the SVG file, execute the SVG file, or interact with the industrial device via the interactive graphical representation.

* * * * *